(12) United States Patent
Hamilton, II et al.

(10) Patent No.: US 9,256,737 B2
(45) Date of Patent: Feb. 9, 2016

(54) SYSTEM AND METHOD FOR TRIGGERING AND PERFORMING SCANS TO PROTECT VIRTUAL ENVIRONMENTS

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

(21) Appl. No.: 12/198,145

(22) Filed: Aug. 26, 2008

(65) Prior Publication Data

US 2010/0057478 A1    Mar. 4, 2010

(51) Int. Cl.
*G06F 21/55* (2013.01)
*G06F 21/51* (2013.01)
*G06F 21/56* (2013.01)
*G06Q 10/08* (2012.01)
*G06Q 20/40* (2012.01)

(52) U.S. Cl.
CPC .............. *G06F 21/554* (2013.01); *G06F 21/51* (2013.01); *G06F 21/564* (2013.01); *G06F 21/566* (2013.01); *G06Q 10/087* (2013.01); *G06Q 20/401* (2013.01)

(58) Field of Classification Search
None
See application file for complete search history.

(56) References Cited

U.S. PATENT DOCUMENTS

| 5,293,614 | A | 3/1994 | Ferguson et al. | |
|---|---|---|---|---|
| 7,640,186 | B1* | 12/2009 | Fraser et al. | 705/26.35 |
| 7,913,305 | B2* | 3/2011 | Bodorin et al. | 726/24 |
| 7,984,304 | B1* | 7/2011 | Waldspurger et al. | 713/187 |
| 2003/0200464 | A1 | 10/2003 | Kidron | |
| 2003/0227392 | A1* | 12/2003 | Ebert et al. | 340/825.49 |
| 2005/0030309 | A1* | 2/2005 | Gettman et al. | 345/419 |
| 2007/0094731 | A1 | 4/2007 | Teodosiu et al. | |
| 2007/0174915 | A1* | 7/2007 | Gribble et al. | 726/24 |
| 2008/0004093 | A1* | 1/2008 | Van Luchene et al. | 463/1 |
| 2008/0163379 | A1* | 7/2008 | Robinson et al. | 726/27 |
| 2008/0207327 | A1* | 8/2008 | Van Luchene et al. | 463/42 |
| 2009/0248696 | A1 | 10/2009 | Rowles et al. | |
| 2010/0031361 | A1 | 2/2010 | Shukla | |

OTHER PUBLICATIONS

Muttik, "The Name of the Game," 2007, McAfee Avert Labs, all pages.*

Yang, X., et al, "Hierarchical Animation Control of Avatars in 3-D Virtual Environments," IEEE Transactions on Instrumentation and Measurement, vol. 54, No. 3, Jun. 2005.

(Continued)

*Primary Examiner* — Nadia Khoshnoodi
(74) *Attorney, Agent, or Firm* — Noah A. Sharkan; Maxine L. Barasch; Keohane & D'Alessandro PLLC

(57) ABSTRACT

A system and method in a virtual universe system for triggering scans of virtual items and inventories of virtual items and for scanning the virtual items and inventories wherein the scans may be triggered by an avatar moving or teleporting from one region to another, or by an avatar picking up, dropping off, or accepting or purchasing an item. The degree of scanning may depend upon factors such as location where these scan triggers occur. The signature of the item may be identified by the scan process. The item signature may be compared against signatures of known malicious items stored in an inventory item signatures database and a summary of the signature comparison may be sent to a resident and stored in the resident's inventory.

18 Claims, 8 Drawing Sheets

(56) References Cited

OTHER PUBLICATIONS

Arrison, S., "'Second Life' Lessons from a Virtual World," TechNewsWorld, Tech Buzz, Jul. 31, 2008, pp. 1-3.

Carter, W. et al, "Untangling the Web—Exploring Methods of Accessing Virtual Worlds," AFB Access World, Mar. 2008, vol. 9, No. 2, pp. 1-12.

SubSane, "Virtual Springfield Windows 95/98 and Macintosh Guide Version 1.0", Apr. 12, 2003, May 1, 2014, <http://www.gamesover.com/walthroughs/virtual_springfield.txt>, 15 pages.

U.S. Appl. No. 12/548,462, Office Action, Jun. 28, 2012, 9 pages.

U.S. Appl. No. 12/548,462, Office Action, Dec. 18, 2012, 8 pages.

U.S. Appl. No. 12/548,462, Office Action, Aug. 16, 2013, 9 pages.

U.S. Appl. No. 12/548,462, Office Action, Dec. 16, 2013, 12 pages.

U.S. Appl. No. 12/548,462, Office Action, Apr. 1, 2014, 23 pages.

U.S. Appl. No. 12/548,462, Office Action, May 8, 2014, 24 pages.

Sensenig, U.S. Appl. No. 12/548,462, Office Action dated Apr. 23, 2015, 17 pages.

\* cited by examiner

SYSTEM AND METHOD FOR TRIGGERING AND PERFORMING SCANS TO PROTECT VIRTUAL ENVIRONMENTS

FIELD OF THE INVENTION

Aspects of the present invention provide a system and method for triggering software scans in virtual environments, such as a virtual universe. Using an embodiment of the present invention, a trigger identification unit may identify a trigger so that an item may be scanned to determine if it is malicious.

BACKGROUND OF THE INVENTION

A virtual universe is a computer-based simulated environment intended for its users to inhabit and interact via avatars. A computer avatar is a personalized graphic file or rendering that represents a computer user. These avatars are usually depicted as textual, two-dimensional, or three-dimensional graphical representations, although other forms are possible (auditory and touch sensations for example). Some, but not all, virtual universes allow for multiple users.

There may be multiple virtual universes. One such virtual universe is provided by Second Life. Second Life is an Internet-based virtual universe launched in 2003, developed by Linden Research, Inc. (commonly referred to as Linden Lab). Second Life is a trademark of Linden Research, Inc.

Many companies are utilizing virtual universes for business functions such as by having on-line stores available for shopping in a virtual space. These virtual stores might sell both real merchandise and virtual goods. An avatar may be used to search for and purchase the real merchandise and virtual goods in the virtual universe in which it exists. Examples of virtual items are design tools, VU-enabled MP3 players, or code enabling unique avatar actions. Such virtual items may contain malicious scripts that either drain valuable resources from either the VU server or the resident's client computer, or exploit vulnerabilities in either the server or client code. As a result, the VU may run slower or crash.

SUMMARY OF THE INVENTION

In general, aspects of the present invention provide systems and methods for triggering the scanning of virtual items or objects for malicious scripts that perform a task and for scanning the "geometry" of objects to look for possible flaws or faults that may contribute to the object's decreased utility or harmful functioning.

One embodiment of the present invention is a method for triggering scans of items in virtual universe having at least one avatar owned by a resident, the avatar having an item and an item inventory, the method performing the steps of determining if an item scan trigger circumstance has occurred; if an item scan trigger circumstance has occurred, scanning item; if an item scan trigger circumstance has not occurred, determining if an item inventory scan trigger circumstance has occurred; if an item inventory scan trigger circumstance has occurred, scanning the item inventory; and if an item inventory scan trigger circumstance has not occurred, determining if background monitoring is enabled and, if background monitoring is enabled, scanning the item inventory.

Another embodiment may be a system in a virtual universe that has at least one avatar, for scanning an item when triggered, the system may have a trigger identification unit for identifying an item scan trigger, an item scanner for scanning the item to determine whether the item is malicious, a notifier for notifying a resident of the determination as to whether the item is malicious, an item movement sensor for sensing the movement of the item, an avatar movement sensor for sensing the movement of the avatar, and an avatar teleport sensor for sensing the teleporting of the avatar.

Yet another embodiment may be a computer program product embodied in a computer readable medium for operating in a system having a network I/O, a CPU, and one or more databases, for implementing a method for triggering scans of items in virtual universe, the virtual universe having at least one avatar owned by a resident, at least one avatar having an item and an item inventory, the method performing the steps of determining if an item scan trigger circumstance has occurred; and if an item scan trigger circumstance has occurred, scanning at least a portion of the item.

Another embodiment embodies a method for deploying computing infrastructure, comprising integrating computer-readable code into a computing system, wherein the code in combination with the computing system is capable of performing a process for triggering scans of items in virtual universe, the virtual universe having at least one avatar owned by a resident, the avatar having an item and an item inventory, the process having at least the steps of determining if an item scan trigger circumstance has occurred; if an item scan trigger circumstance has occurred, scanning item; if an item scan trigger circumstance has not occurred, determining if an item inventory scan trigger circumstance has occurred; if an item scan inventory trigger circumstance has occurred, scanning the item inventory; if an item inventory scan trigger circumstance has not occurred, determining if background monitoring is enabled and if background monitoring is enabled, scanning the item inventory.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Aspects of the present invention provide a solution for triggering a scan of a virtual object (or a virtual item) or an item inventory in a virtual universe, scanning the item or item inventory, and for notifying a resident owning an avatar having the item or item inventory. The system and method of the present invention provides an interface so that an object may be externalized and found outside of its virtual universe. The system and method of the present invention also provides for searching for the objects and will stop searching after a maximum number of tries. Still yet, any of the components of the present invention could be deployed, managed, serviced, etc., by a service provider who offers to provide a solution for tagging or externalizing the objects in the system.

Figure 1:
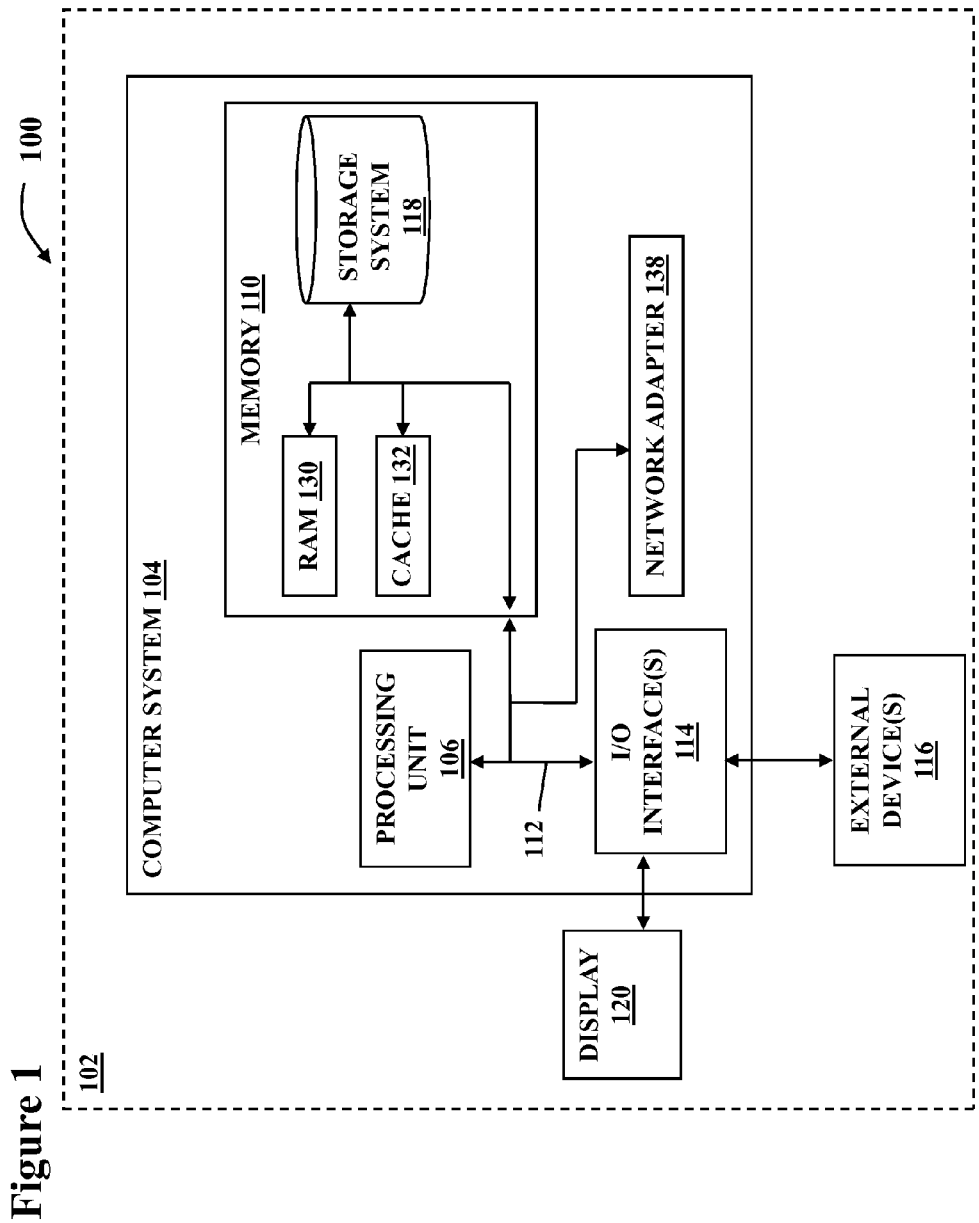
FIG. 1 shows a data processing system suitable for implementing an embodiment of the present invention.

A system, such as System 100, may have a data processing system, such as Data Processing System 102 shown in FIG. 1, suitable for storing and/or executing program code of the present invention may include a computer system, such as Computer System 104, having at least one processor (Processing Unit 106) coupled directly or indirectly to memory elements (Memory 110) through a system bus, such as System Bus 112. Memory 110 can include local memory (RAM 130) employed during actual execution of the program code, bulk storage (Storage 118), and cache memories (Cache 132) that provide temporary storage of at least some program code in order to reduce the number of times code must be retrieved from bulk storage 118 during execution. Input/output or I/O devices (External Devices 116) (including but not limited to keyboards, display(s) (Display 120), pointing devices, etc., can be coupled to the system either directly or through intervening I/O controller(s) (I/O Interface(s) 114).

Figure 2:
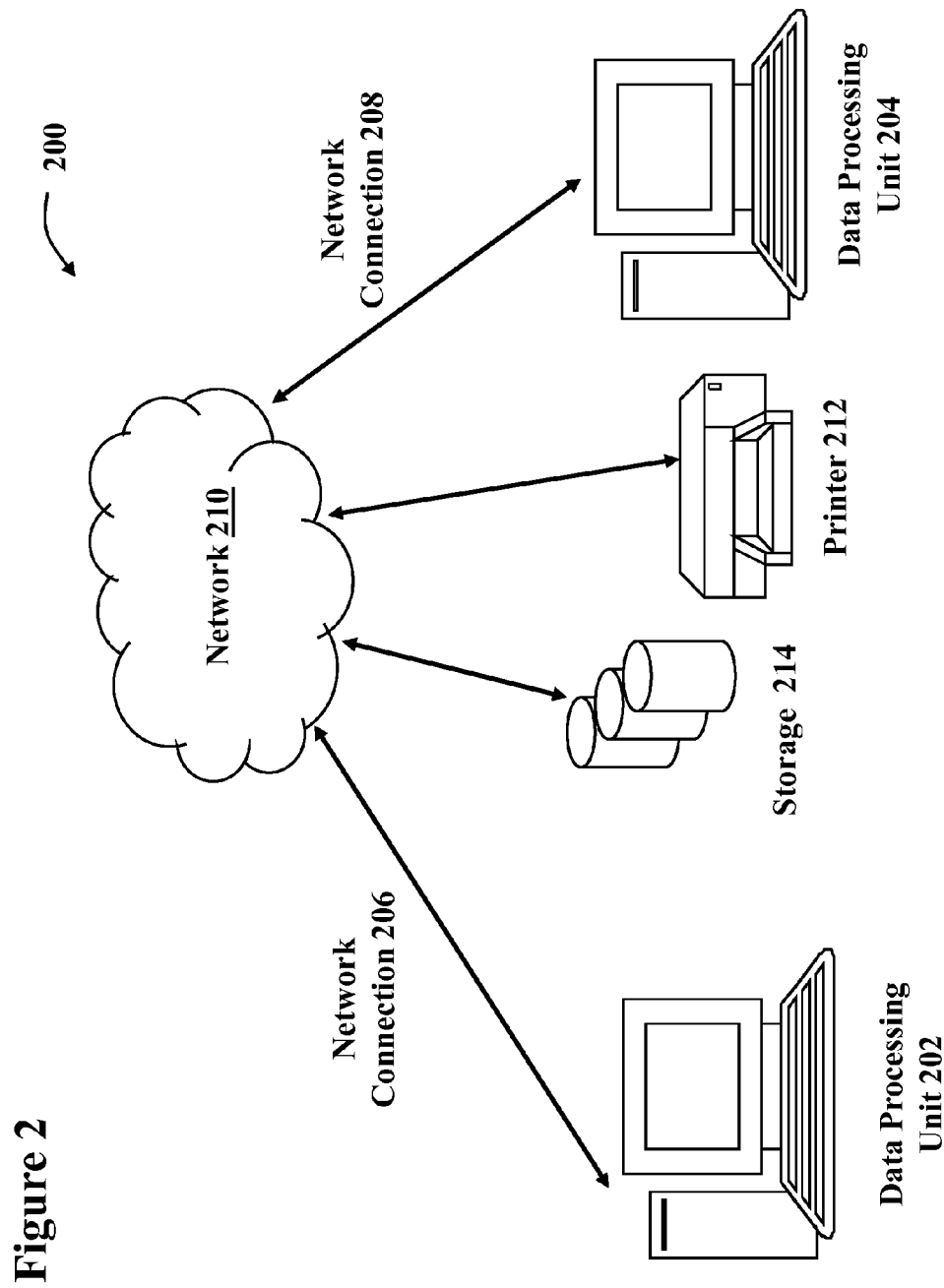
FIG. 2 shows a network for implementing an embodiment of the present invention.

Network adapter(s) (Network Adapter 138) may also be coupled to a system, such as System 200 as shown in FIG. 2, to enable the data processing system (Data Processing Unit 202) to become coupled through one or more network connections (Network Connections 206, 208) to other data processing system(s) (Data Processing Unit 204), remote printers (Printer 212) and/or storage devices (Storage 214) through intervening private and/or public networks (Network 210). (A computer network is composed of multiple computers connected together using a telecommunication system for the purpose of sharing data, resources and communication). Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

With the growing popularity and adoption of virtual environments both personal and business functions are becoming increasingly available. Some companies, such as International Business Machines Corporation, have on-line stores available for shopping in a virtual space and these virtual stores might sell both real merchandise and virtual items. With a variety of virtual universes presently available, and the potential for many more, as this venue becomes increasingly popular, it is important that items purchased or exchanged are not malicious or malfunctioning so as to avoid slowing down or further contaminating the VU. There are certain circumstances at which it is optimal to scan an item for malicious or malfunctioning code, or scripts, or for malicious or malfunctioning geometries to minimize further contamination of the VU. The present invention provides a system and method of triggering item or software scans based upon such circumstances such as movement of an item or an avatar having an item, the location of an item, a purchase of an item, or an acceptance of an item by an avatar. The present invention further provides a system and method of scanning the item or software by examining the scripts of the item or the geometry of the item and comparing the identified scripts against scripts in an inventory item signature database to determine whether the identified scripts are malicious or malfunctional.

Residents may be represented in the environment by an avatar. The basic avatar is humanoid in shape that may be customized in a variety of ways:

- a series of GUI controls, modifying every aspect of the basic mesh (body shape, skin, hair style etc.);
- creating clothing or buying clothes made by other residents;
- attachments—3D objects intended to supplement or replace body structure, clothes or hair;
- animation overriders (intended to supplement or replace the stock set of animations) using, for instance, a scripting language to trigger animations stored in an animation file format; and/or
- sonic overriders—using a scripting language to trigger sounds such as footsteps, or emotive cues such as laughing and crying.

Any of these could be considered to be a virtual good, object or item. These items may be kept in an inventory accessible by the associated avatar for the avatar's use when desired.

The result can either be faithful to the original humanoid avatar, or can result in a completely non-humanoid representation of the character. These customizations can be packaged up into a single outfit, with common applications of outfits.

VU users (owners of avatars) typically have an inventory of items that they own, and these inventory items may be bought, sold, traded, etc. during operation of the VU. Items in a typical item inventory may include clothing, virtual pets, vehicles, electronic media (e.g., music files), or other possessions. Each inventory item may represent a piece of code or other data that may be rendered in some fashion to the user during a session in the VU. Clothing inventory, for example, may be rendered as clothing for the user's avatar while a virtual dog, in another example, may render as an automated avatar that follows the user's avatar within the VU. The contents of a user's inventory are typically displayed in a hierarchical manner similar to an operating system's display of folders, subfolders, and files within a file system.

As noted above, inventory items may be any item that may be associated with a user in a virtual universe. Inventory items may each be composed of one or more files, be part of a larger database, or be stored in any other fashion. In some embodiments, an inventory item may be a piece of software code that is renderable in a virtual universe. In other embodiments, inventory items may be represented as non-executable data that may be used by the VU to render the inventory item for the user when needed. Non-limiting examples of inventory items include graphics files, sound files, animations, electronic documents, video files, avatar clothing or accessories, avatar body parts, avatar tools or vehicles or other objects, avatar gestures, automated avatars, calling cards, landmarks (such as bookmarked locations) or other geographical information, items in a lost and found folder, note cards, photos and photo albums, scripts (e.g., macros to perform actions), textures, deleted items, or any other type of item. Inventory items may include executable code, non-executable data, or any other type of information, and may also represent any type of item within a VU.

The VU environment provides an opportunity for commercial vendors to market their wares and conduct other commerce with others who are resident in the VU via avatars. However, there is a risk that the items that are being conveyed between the stores and the avatars or between avatars are malicious or malfunctional.

Figure 3:
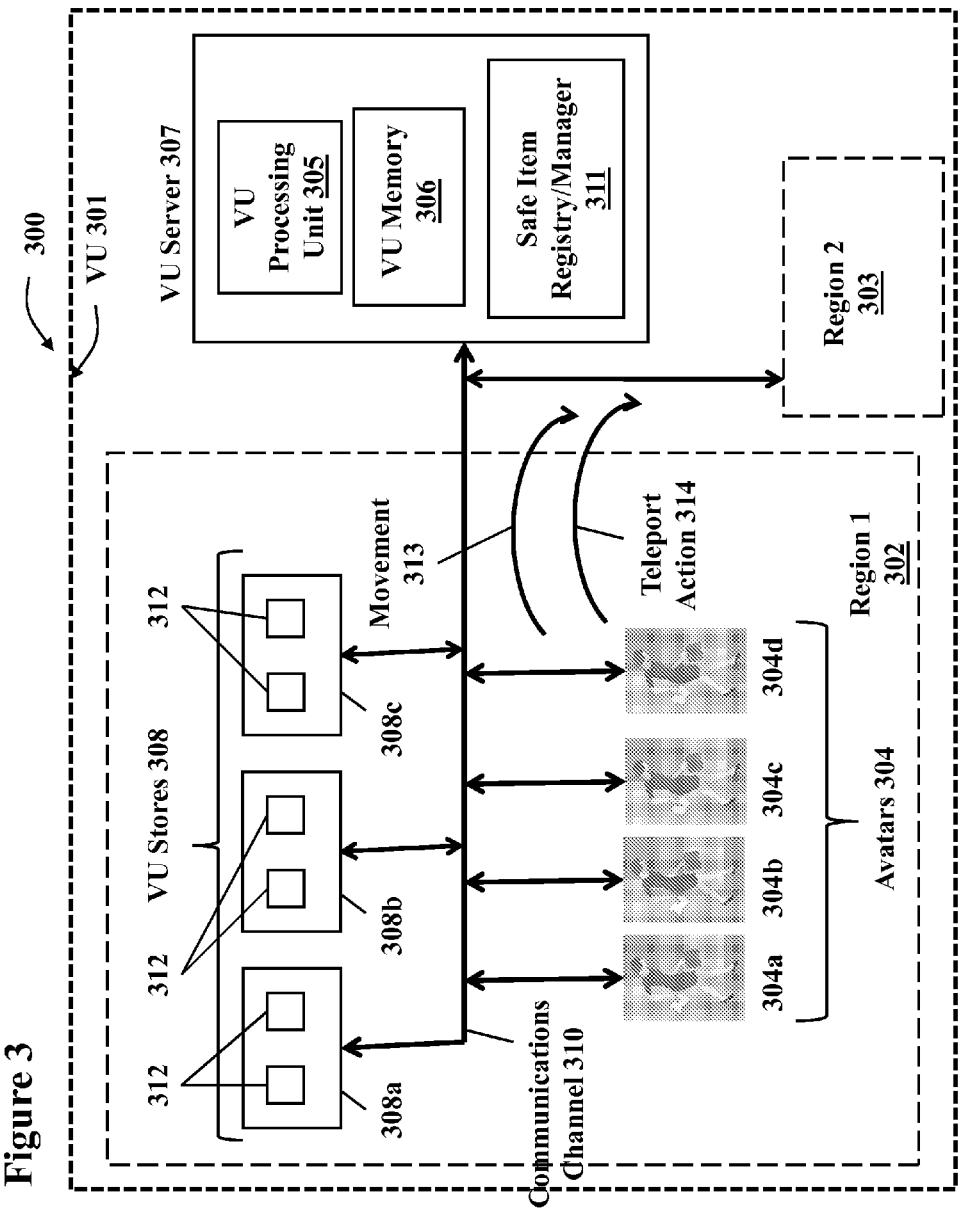
FIG. 3 illustrates an embodiment of the system of the present invention.

A system, such as System 300, for implementing the present invention is shown in FIG. 3 having a virtual universe (VU 301) that may have a VU server, such as VU server 307, having a VU processing unit, such as VU Processing Unit 305, a VU memory, such as VU Memory 306 for storing information about VU 301 and activities and avatars within VU 301, and a safe item/registry manager, such as Safe Item Registry/Manager 311 for registering and managing known "safe" items. VU 301 may further have one or more avatars, such as Avatars 304 (304a, 304b, 304c, 304d). There can be any number of Avatars 304. Avatars 304 can communicate with one another, with VU Stores 308, with VU Processing Unit 305 or with VU Memory 306 or with other assets (such as avatar attachments, vehicles, buildings, furniture, sculpture or other items) in VU 301 via Communications Channel 310. Avatars 304 are considered to be VU residents. Alternatively, a "resident" may be considered the human owner of the avatar.

VU 301 further may have VU Stores 308. Each VU store, such as VU Store 308a, 308b, 308c may have Items (or objects) 312 for sale to Avatars 304. Items 312 may be real or virtual. A real item or object may be a car or a motorcycle, for example. A virtual item or object may be anything from clothing for the avatar or a dental chart. The system allows an avatar to purchase a real or a virtual item or good. VU 301 may have regions, such as Region 1 302 and Region 2 303. Avatars 304 may move between Regions 302, 303 as indicated by Movement arrow 313 or may take a teleport action between Regions 302, 303 as indicated by Teleport Action arrow 314.

Figure 4:
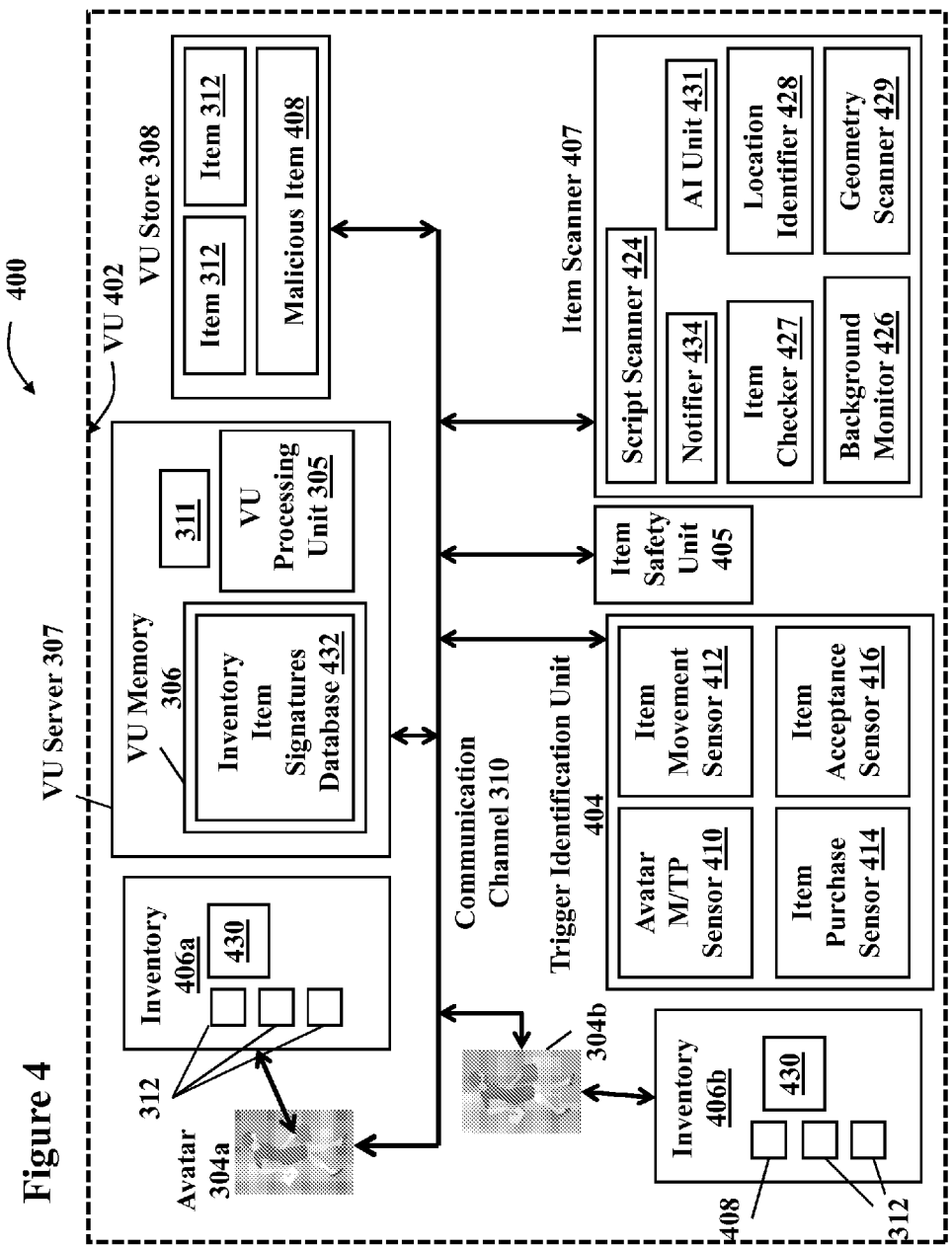
FIG. 4 illustrates a virtual universe having multiple avatars and an embodiment of a scan trigger system of the present invention.

FIG. 4 illustrates a system, such as System 400, that may have a virtual universe, such as Virtual Universe 402. As noted with respect to FIG. 3, Virtual Universe 402 may have one or more avatars such as Avatars 304a, 304b, one or more VU stores such as VU Store 308, a VU server, such as VU Server 307 having a memory, such as VU Memory 306, a processing unit such as VU Processing Unit 305, and a safe item registry and manager, such as Safe Item Registry/Manager 311, interconnected by Communication Channel 310. VU 402 may further have Trigger Identification Unit 404, Item Safety Unit 405, and Item Scanner 407. Each avatar (Avatar 304a, 304b) may have an item inventory, such as Item Inventory 406a (associated with Avatar 304a) and Item Inventory 406b (associated with Avatar 304b), for storing Inventory Items 312, 408.

Avatars 304a, 304b may purchase Items 312, 408 from VU Store 308, exchange the items with one another, take an item into another region as discussed in relation to FIG. 3, or pick up or drop off an item. As previously discussed, the items may be clothing or other goods as represented by Item 312. However, an item may be malicious or malfunctional as represented by Malicious Item 408. An avatar maintains its items in its inventory, such as Inventory 406a, 406b.

The system and method of the present invention triggers the initiation of software scans for malicious and malfunctional items when certain circumstances occur utilizing Trigger Identification Unit 404. Trigger Identification Unit 404 may have Avatar M/TP Sensor 410 that senses the movement and teleporting (M/TP) of Avatars 304a, 304b into and out of regions as discussed in relation to FIG. 3. Trigger Identification Unit 404 may have Item Movement Sensor 412 that senses the movement of Items 312, 408 into and out of regions as discussed in relation to FIG. 3 or senses the movement of items into or out of Inventory 406a, 406b or when items are located within Inventory 406a, 406b, for example. Trigger Identification Unit 404 may further have Item Purchase Sensor 414 that senses the purchase of Items 312, 408 by Avatars 304a, 304b and may further have Item Acceptance Sensor 416 that senses the acceptance of Items 312, 408 by Avatars 304a, 304b. Each of these may be considered to be an item scan trigger circumstance.

If one of the units in Trigger Identification Unit 404 senses an item scan trigger circumstance, such as an item moving between regions (e.g., between a building and an island or land) or senses an avatar having an item moving between regions (e.g., between a building and an island or land), or senses an item moving into or out of an inventory, for example, or senses an item purchase by an avatar, or senses an acceptance of an item by an avatar, or senses an avatar simply picking up or dropping off of an item, an item software scan is triggered (a trigger signal is sent to Item Scanner 407) and the item software scan is initiated by Item Scanner 407. Item Scanner 407 may scan the item or at least a portion of the item to determine whether the item is malicious or malfunctional. Item Scanner 407 may have Script Scanner 424 for scanning the scripts of the item. Item Scanner 407 may have Location Identifier 428 for identifying the location and movement of an avatar or an item. The location of the avatar or item within the VU may dictate whether the item is scanned or may dictate the extent of the item scan as a location may tend to have more or less malicious or malfunctional items as compared to other locations. Item Scanner 407 may further have a geometry scanner, such as Geometry Scanner 429, for scanning the geometry of an item or at least a portion of an item. Geometry Scanner 429 may scan for possible flaws or faults that may contribute to the item's decreased utility or harmful functioning. For example, a container may have cracks that may correspond to possible improper functioning or malicious intent and Geometry Scanner 429 can identify the cracks.

VU 402 may have Item Safety Unit 405 for isolating malicious or malfunctional items via a quarantining process, for converting malicious or malfunctional items via a conversion process to nonmalicious or functional items, or for replacing malicious or malfunctional items via a replacement process to nonmalicious or functional items.

Item Scanner 407 may have an alert system, such as Notifier 434, that may provide alerts (to VU staff, other avatars, or to resident) when a malicious item is detected. The VU alert may also be transmitted to a user outside of the VU, for example, to a user's client computer that may record such problems. The following steps show the basic method of one embodiment of the present invention:

1. An inventory item (such as Items 312, 408) may be scanned by an item scanner, such as Item Scanner 407;
2. A measure of the item's safety may be conveyed by safety conveyor, such as Notifier 434; and
3. If a malicious inventory item is detected, the item may be quarantined or converted to a safe item by an item safety unit, such as Item Safety Unit 405.

In step 1, an inventory item or at least a portion of an inventory item may be scanned. For example, a database of malicious items (such as Inventory Item Signatures Database 432) may be maintained by a virtual universe, such as VU 402 or a third party, and the codes, scripts or geometries in such a database, such as Inventory Item Signatures Database 432, may be used for comparison against codes, scripts or geometries in inventory items. This scanning may occur on a regular basis (i.e., if a background monitor, such as Background Monitor 426, is running) or only when an item is received, placed into an inventory, or withdrawn from an inventory, for example. The item scanning allows a resident to analyze all of the items in the avatar's inventory to check for malicious code. If desired, a user or VU may decide to analyze only a portion of the resident's inventory, for example, those portions (e.g., avatar gestures or items used while an avatar is flying) that may be more likely to contain malicious code when executed.

Additionally, scanning may be triggered upon entry to a region (e.g., a building, an island, or a land region) or when an item is picked up from the surrounding environment. There may be other likely points for malicious item acquisition and use where scanning may be beneficial.

A trigger (an item scan trigger circumstance) may occur when:
- an item is placed in an inventory;
- an item is removed from an inventory;
- an item is picked up from a region (e.g. building, island, or land region) or deposited in a region;
- an item is accepted from an avatar who is offering the item;
- at the point of purchase of an item (many items are bought and sold in a VU); or
- an avatar is entering or leaving a region (e.g., by walking or teleporting).

The degree of scanning performed may depend on one or more of the above criteria. For example, if an item is removed from the inventory, its safety may be assessed by examining one signature database. If it is accepted from another avatar, more signature databases may be searched, even if the search requires more time to conduct. Other signature databases could be in multiple locations—for example, one company, such as International Business Machines Corporation, may maintain a signature database, a second company may maintain another signature database, and so forth. These may be accessible via the Internet.

During the inventory scanning, the scanner, such as Item Scanner 407, searches for traces of a malicious script by using an inventory item signatures database, such as Inventory Item Signatures Database 432. Just like other executable programs, inventory items are often constructed from codes. When a malicious piece of item code is discovered, the system may record such malicious codes as "signatures" and incorporate them in its VU database.

The item scanning enables a VU resident to have a summary of the "safety" of items in its inventory, such as Item Safety Summary 430, at any given moment. In order to provide real-time constant protection, the VU item scanner may use active background monitoring, such as with Background Monitor 426, with or without a resident aware of its presence. The background embodiment monitors some or all of the resident's inventory items, particularly those that are being placed in or withdrawn from an inventory, and may analyze each item that is traded between residents. This always-on background monitoring allows the system to prevent the spread of malicious items.

More frequent or comprehensive scanning may be done according to the location that an avatar is located in or in which the avatar acquired an item. For example, virtual islands or structures associated with prior problems may be sources for malicious items. Regions that have a known history of problems, such as residents picking up malicious items in these regions, are considered to be regions of ill repute. The history of problems may be kept by the provider of the VU item scanning service. For example, residents may tag a region as potentially being the source of malicious items.

In some cases, inventory items may be polymorphic. A polymorphic inventory item is an inventory item whose signature changes each time the item is given to another resident or taken out of an inventory, for example. In order to identify such items with high probability, the system uses artificial intelligence technology (such as AI Unit 431) to detect these items by recognizing patterns that are likely to be abnormal. Residents may be alerted to watch these items for "possible" problems and told not to give these items to others unless they feel relatively certain that the item is not malicious or malfunctioning. For example, a malicious item may behave differently from a normal one in that it may try to create multiple copies of itself, write information, etc. If the scanner detects an inventory item that contains several anomalies or behaves in a suspect manner (e.g., an item that attempts to remove other items), it may trigger an inventory item alert. In this manner, the scanner may be able to block malicious items for which exact matches are not stored in the malicious item signature database.

The incidence of false alerts (e.g., the scanner may mistake a useful item for a malicious one) may be minimized by using other methods provided by a checking module, such as Item Checker 427, that may make use of an item signature database, such as Inventory Item Signatures Database 432. This module may regularly check certain attributes of items (such as the size, creation date and calculated checksum) and check for similarities and differences between the attributes of the scanned item and the attributes of the known malicious items for determining the maliciousness of the scanned item. When this data is modified in a possibly inappropriate manner, it may mean that a malicious item is present and modifying other objects.

In some embodiments, the system may make use of a central VU server, such as VU Server 307, that is difficult to compromise or maliciously alter. Thus, when a "safe" item is created, it may be registered with this service, such as Safe Item Registry/Manager 311, and a unique ID is created for all copies of that object along with date/size/checksum, etc. If the item deviates from those central storage characteristics, then the item is considered as bad (malicious or malfunctioning). If an item had been registered and declared safe but then turns out to be malicious, the item may be automatically destroyed or isolated.

In step 2, the user, VU, or third party may be notified as to the item's safety, and this notification can take the form of: a message, a change in coloration of the item, a certification sent by mail, a phone call to the resident, a stamp printed on the item, a sticker on the item, a code printed on the item, email, or fax.

In step 3, the item may be converted (e.g., virtual business assistant or VU-enabled executable code is scanned for malicious behavior and converted to an item without such behavior) or it may be quarantined (e.g., an entity such as a financial advisor or intelligent companion shaped as a robot is scanned for malicious behavior and quarantined.)

Figure 5:
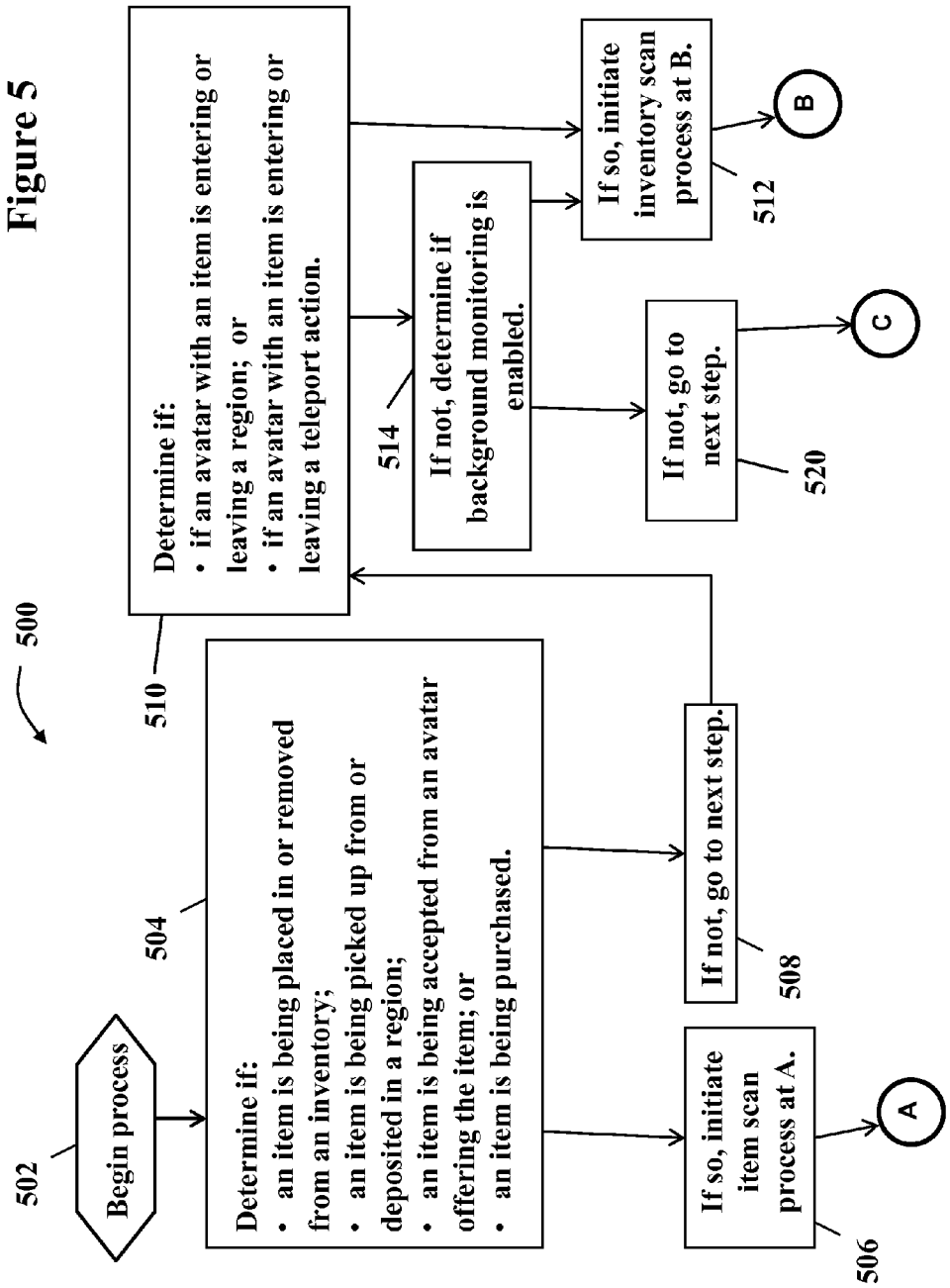
FIG. 5 illustrates a method for triggering an item scan according to an embodiment of the present invention.

FIG. 5 illustrates a process 500 for triggering an item software scan. At 502, the process begins and at 504, Trigger Identification Unit 404 determines if an item scan trigger circumstance has occurred, such as:
- an item is being placed in or removed from an inventory by an avatar;
- an item is being picked up from or deposited in a region by an avatar;

an item is being accepted by an avatar from another avatar offering the item; or an item is being purchased by an avatar.

Figure 6:
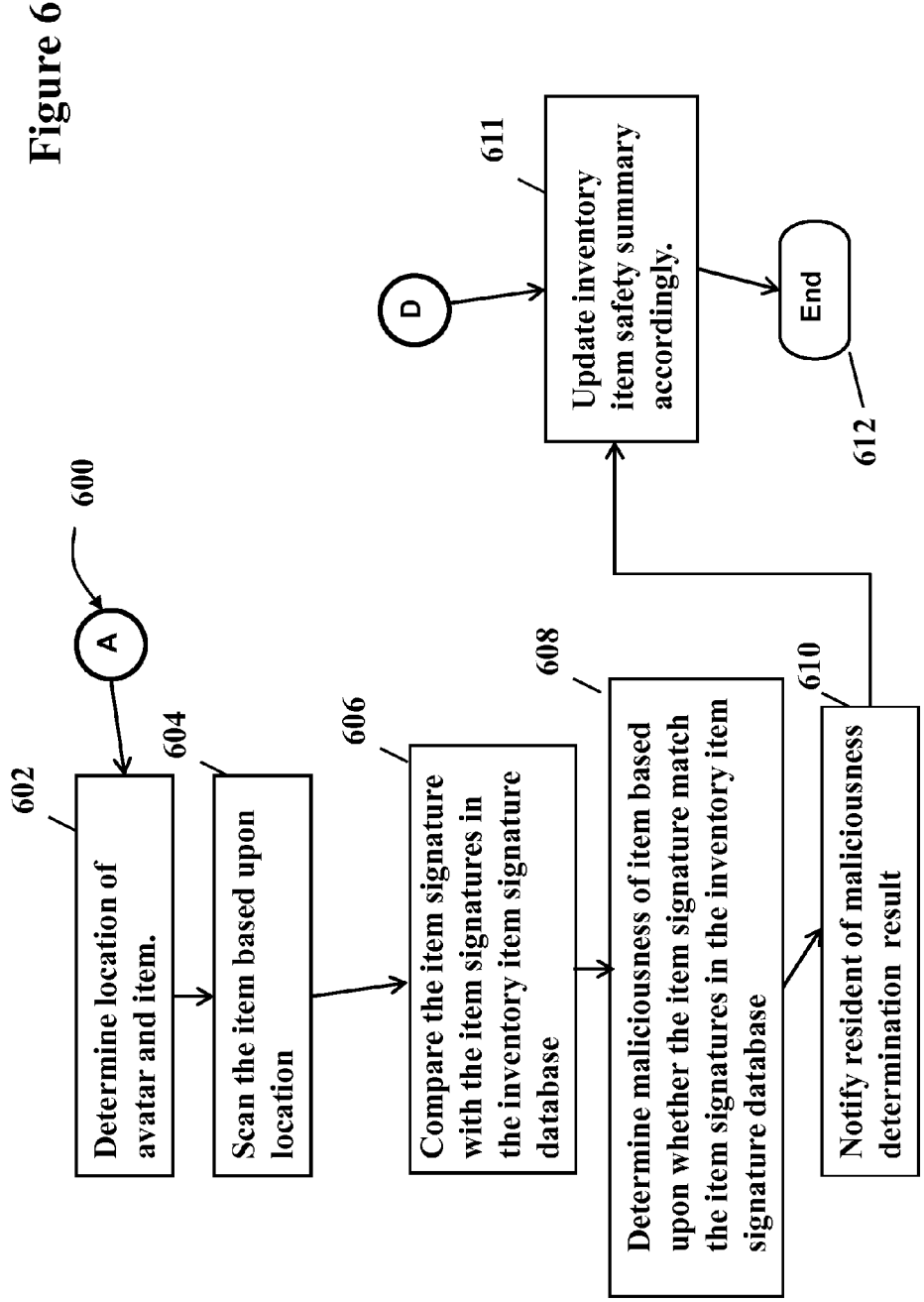
FIG. 6 is an illustrative embodiment of a method of the present invention for scanning an item for maliciousness and notifying a resident of the maliciousness of the item.

If an item scan trigger circumstance has occurred, at 504, a scan is initiated at 506 and the process continues at A as described in relation to Method 600 as depicted in FIG. 6. At 602, Location Identifier 428 may determine the location of the avatar and the item. At 604, Item Scanner 407 may scan the item based upon the determined location of the avatar and the item. The extent of the scan may depend upon the determined location of the avatar and the item as some locations may be known to be more prone to malicious or malfunctioning items. At 606, the item signatures are compared with the item signatures in the inventory item signature database. Item signatures may be such signatures as software scripts or the geometry of the item. At 608, maliciousness and the functionality of the item is determined based upon whether and how many item signatures match item signatures of known malicious or malfunctioning items in the inventory item signature database. At 610, the resident owning the avatar having the item may be notified of maliciousness determination result and the process continues at 611, at the avatar's inventory (such as Inventory 406a), the inventory item safety summary (such as Item Safety Summary 430) may be updated accordingly and the method ends at 612.

If, at 504, none of the circumstances apply, at 508, the method continues at 510 where it may be determined if:

if an avatar with an item is entering or leaving a region (as may be determined by Avatar M/TP Sensor 410); or if an avatar with an item is entering or leaving a teleport action (as may be determined by Avatar M/TP Sensor 410).

Figure 7:
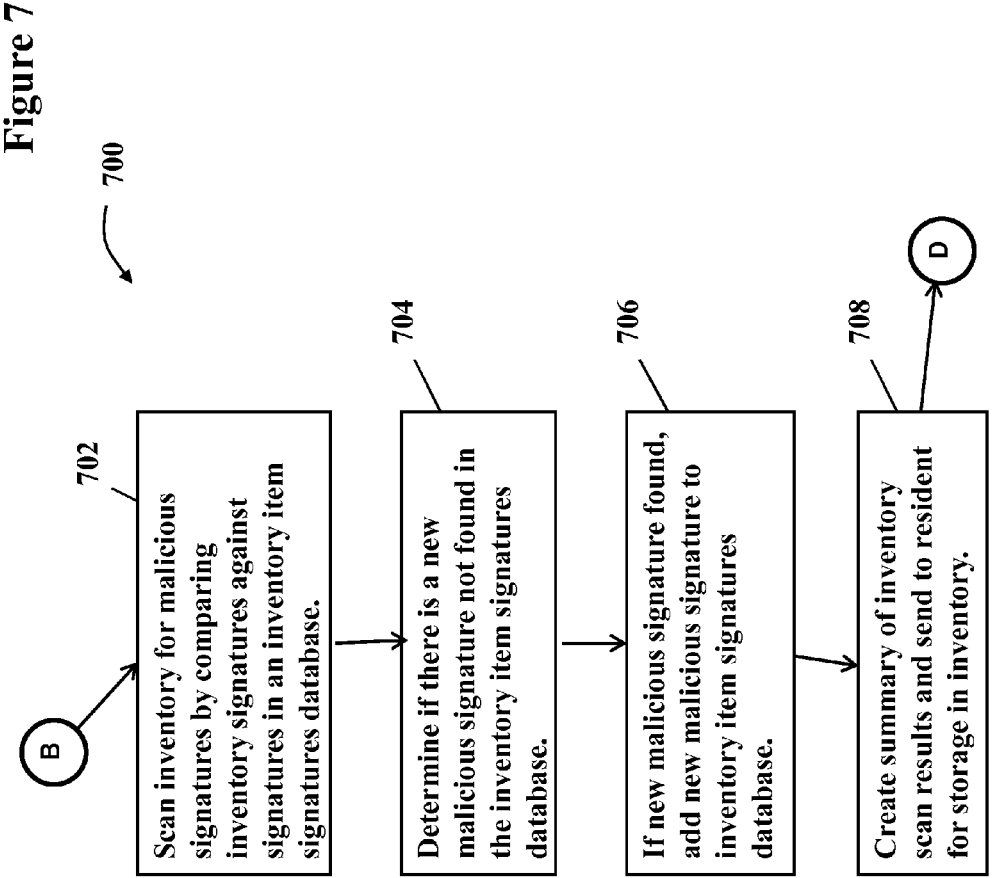
FIG. 7 is an illustrative embodiment of a method of the present invention for scanning an item inventory for malicious items and creating a summary of the inventory scan.
Figure 8:
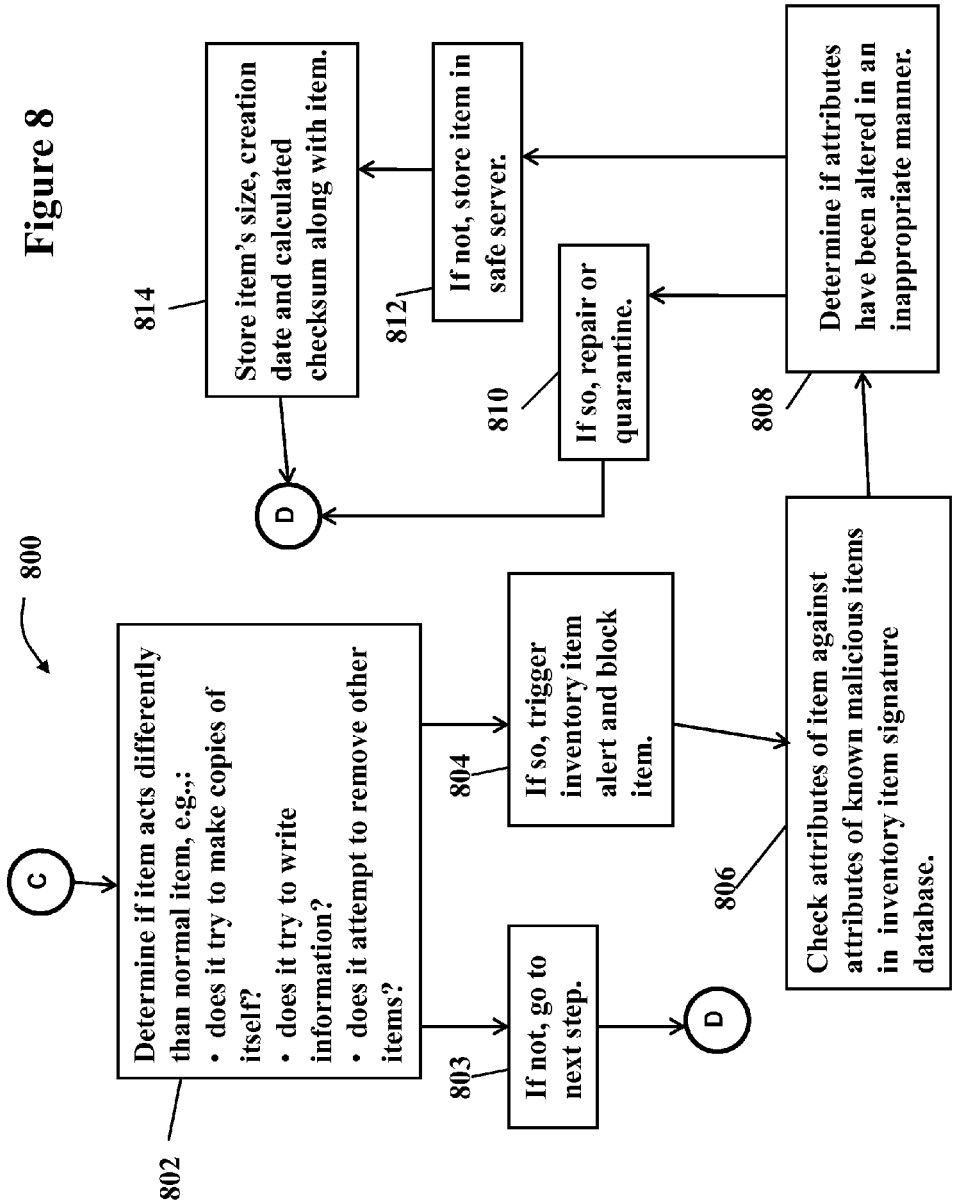
FIG. 8 is an illustrative embodiment of a method of the present invention for utilizing artificial intelligence in the event that a malicious item signature is not in an inventory item signature database.

If neither of these circumstances apply, at 514, it is determined whether background monitoring is enabled (i.e., Background Monitor 426) and, if not, at 520, the method continues at C as discussed in relation to FIG. 8. If either of the circumstances of 510 apply or if background monitoring is determined to be enabled at 514, an item inventory scan trigger circumstance has occurred and an inventory scan is initiated at 512 which continues at B as shown in FIG. 7.

FIG. 7 illustrates Method 700 as continued from B as discussed in relation to FIG. 5 for scanning an item inventory, such as Inventory 406a. If an item inventory scan trigger circumstance has occurred, at 702, the item inventory is scanned for malicious signatures, such as scripts, by comparing inventory items signatures, such as item scripts, against item signatures in an inventory item signatures database, Inventory Item Signatures Database 432. At 704, it is determined whether there is a new malicious signature not found in the inventory item signatures database. If new malicious signature found, at 706, the new malicious signature is added to inventory item signatures database. At 708, a summary of inventory scan results is created and sent to the resident for storage in the item inventory.

FIG. 8 illustrates Method 800 for utilizing artificial intelligence in the event that the malicious item signature is not in the inventory item signature database. At 802, it is determined if the item tries to make copies of itself, if the item tries to write information, or if the item attempts to remove other items. At 803, if not, the method continues to D as discussed in relation to FIG. 6. If so, at 804, an inventory item alert is triggered and the item is blocked from taking any actions. At 806, the attributes of the item are checked against attributes of known malicious items in the inventory item signature database. At 808, it is determined if the attributes have been altered in an inappropriate manner and, if so, at 810, the item is repaired or quarantined and continues to D as discussed in relation to FIG. 6. If not, at 812, the item is stored in a safe server such as VU Server 307. At 814, the item's size, creation date and calculated checksum is stored along with item in the safe server and the method continues to D as discussed in relation to FIG. 6.

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc.

While shown and described herein as a system and method for triggering an item scan of an item in a virtual universe based upon an analysis of various circumstances related to the item and avatar and for scanning the item and the item inventory, it is understood that the invention further provides various alternative embodiments. For example, in one embodiment, the invention provides a computer-readable/useable medium that includes computer program code to provide a solution for triggering an item or inventory scan. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for triggering a scan and for scanning the item or item inventory so that malicious items may be identified. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

In another embodiment, the invention provides a business method that performs the process steps of the invention on a subscription, advertising, and/or fee basis. That is, a service provider, such as a solution integrator, could offer to provide a solution for triggering item scans and for performing the item scans in a virtual universe. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer system comprising a processor and a memory, the computer system generating a virtual universe having at least one avatar, the computer system comprising:
    a trigger identification unit for receiving an identified item scan trigger circumstance;
    an item scanner for scanning, based on a location of the virtual item in the virtual universe, each virtual item in an inventory of the avatar, including the virtual item, to determine whether the virtual item is malicious, wherein a frequency of scanning the inventory of the avatar is increased in the case that the location of the virtual item in the virtual universe indicates a higher potential for malicious items;
    an item movement sensor for sensing the movement of the virtual item; and
    an avatar teleport sensor for sensing the teleporting of the avatar.

2. The system as defined in claim 1, wherein the trigger identification unit comprises an item acceptance sensor for sensing an acceptance of a virtual item by an avatar and an item purchase sensor for sensing a purchase of a virtual item by an avatar.

3. The system as defined in claim 1 further comprising an inventory item signatures database having signatures of known malicious virtual items, and wherein the item scanner identifies the scanned item signature and compares the scanned item signature with the signatures in the inventory item signatures database.

4. The system as defined in claim 3, wherein the signatures in the inventory item signatures database include scripts, and wherein the item scanner comprises a script scanner for scanning the scripts of a virtual item and for comparing the scanned scripts with the scripts in the inventory item signatures database.

5. The system as defined in claim 4, wherein the avatar has an inventory having one or more virtual items, and wherein the item scanner provides a summary of the scan of the virtual item to the avatar for storing the summary in the inventory.

6. A method for triggering scans of items in a virtual universe, the virtual universe having at least one avatar owned by a resident, the at least one avatar having a virtual item and an item inventory, the method comprising:
    receiving an item scan trigger circumstance; and
    scanning, based on a location of the virtual item in the virtual universe, each virtual item in an inventory of the avatar, including the virtual item, to determine whether the virtual item is malicious, wherein a frequency of scanning the inventory of the avatar is increased in the case that the location of the virtual item in the virtual universe indicates a higher potential for malicious items;
    determining if background monitoring is enabled and, if background monitoring is enabled, scanning at least a portion of the item inventory belonging to the avatar;
    determining if the virtual item is acting differently than a normal virtual item, and if so:
        triggering an item alert and blocking the virtual item,
        checking attributes against attributes of known malicious virtual items, and
        updating an inventory item safety summary accordingly.

7. The method as defined in claim 6 further comprising determining if the virtual item is being placed in or removed from the item inventory belonging to the avatar.

8. The method as defined in claim 6 further comprising determining if the virtual item is being picked up from or deposited in a region of the virtual universe.

9. The method as defined in claim 6 further comprising determining if the virtual item is being purchased by the avatar.

10. A method for deploying a computing infrastructure comprising integrating computer-readable code into a computing system, wherein the code in combination with the computing system is capable of performing a process for triggering scans of virtual items in a virtual universe, the virtual universe having at least one avatar owned by a resident, the at least one avatar having a virtual item and an item inventory, the process comprising:
    receiving an item scan trigger circumstance;
    scanning, based on a location of the virtual item in the virtual universe, each virtual item in an inventory of the avatar, including the virtual item, to determine whether the virtual item is malicious, wherein a frequency of scanning the inventory of the avatar is increased in the case that the location of the virtual item in the virtual universe indicates a higher potential for malicious items;
    determining if background monitoring is enabled and, if background monitoring is enabled, scanning at least a portion of the item inventory belonging to the avatar;
    determining if the virtual item is acting differently than a normal virtual item, and if so:
        triggering an item alert and blocking the virtual item,
        comparing attributes of the virtual item with attributes of known malicious virtual items,
        identifying similarities and differences between the attributes of the virtual item with attributes of known malicious items,
        determining the maliciousness of the virtual item based upon the identified similarities and the differences, and
        updating an inventory item safety summary with the determined maliciousness of the virtual item.

11. The method as defined in claim 10, wherein the process further comprises determining if the virtual item is being placed in or removed from the item inventory belonging to the avatar.

12. The method as defined in claim 10, wherein the process further comprises determining if the virtual item is being picked up from or deposited in a region of the virtual universe.

13. The method as defined in claim 10, wherein the virtual item has a signature, and the virtual universe has an inventory item signature database having signatures of known malicious virtual items, and wherein the process further comprises:
    scanning the signature of the virtual item based upon the location;

comparing the item signature with signatures of known malicious virtual items in the inventory item signature database;

determining the maliciousness of the virtual item based upon the extent of similarity of the match between the item signature and the signatures of the known malicious virtual items in the inventory item signature database; and notifying the resident of the maliciousness determination result.

14. The method as defined in claim 10, wherein the process further comprises creating a summary of the virtual item scan and sending the summary to a resident for storage in an inventory.

15. A computer program product embodied in a computer readable storage device for operating in a system comprising at least one computer system having a network adapter for accessing a network, a processing unit, and a memory, for implementing a method for triggering scans of virtual items in a virtual universe, the virtual universe having at least one avatar owned by a resident, the at least one avatar having a virtual item and an item inventory, the method comprising:

receiving item scan trigger circumstance has occurred;

scanning, based on a location of the virtual item in the virtual universe, each virtual item in an inventory of the avatar, including the virtual item, to determine whether the virtual item is malicious, wherein a frequency of scanning the inventory of the avatar is increased in the case that the location of the virtual item in the virtual universe indicates a higher potential for malicious items;

determining if background monitoring is enabled and, if background monitoring is enabled, scanning at least a portion of the item inventory belonging to the avatar;

determining if the virtual item is acting differently than a normal virtual item, and if so:

triggering an item alert and blocking the virtual item, comparing attributes of the virtual item with attributes of known malicious virtual items, identifying similarities and differences between the attributes of the virtual item with attributes of known malicious items, determining the maliciousness of the virtual item based upon the identified similarities and the differences, and updating an inventory item safety summary with the determined maliciousness of the virtual item.

16. The computer program product embodied in a computer readable storage device as defined in claim 15, wherein the method further comprises, if an item scan trigger circumstance has not occurred, determining if an item inventory scan trigger circumstance has occurred, and wherein the method further comprises, if the item inventory scan trigger circumstance has occurred, scanning at least a portion of the item inventory belonging to the avatar, the item inventory having one or more virtual items possessed by the avatar.

17. The computer program product embodied in a computer readable storage device as defined in claim 16, wherein the method further comprises, if an item inventory scan trigger circumstance has not occurred, determining if background monitoring is enabled and, if background monitoring is enabled, scanning at least a portion of the item inventory belonging to the avatar.

18. The computer program product embodied in a computer readable storage device as defined in claim 17, wherein the virtual item has a signature, the virtual universe has an inventory item signature database having signatures of known malicious items, and wherein the method further comprises:

scanning the signature of the virtual item based upon the location;

comparing the item signature with the signatures of known malicious virtual items in the inventory item signature database;

determining the maliciousness of the virtual item based upon the extent of the similarity between the item signature and the signatures of the known malicious virtual items in the inventory item signature database; and notifying the resident of the maliciousness determination result.

\* \* \* \* \*